UNITED STATES PATENT OFFICE.

PAUL JULIUS AND CARL IMMERHEISER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

AZO DYE.

1,073,904.  Specification of Letters Patent.  Patented Sept. 23, 1913.

No Drawing.  Application filed May 28, 1913. Serial No. 770,330.

*To all whom it may concern:*

Be it known that we, PAUL JULIUS and CARL IMMERHEISER, citizens, respectively, of the Austro-Hungarian Empire and of the German Empire, residing at Ludwigshafen-on-the-Rhine, Germany, have invented new and useful Improvements in Azo Dyes, of which the following is a specification.

We have discovered new coloring matters which can be produced by combining diazotized amino-phenol-alkyl-ethers with benzoyl-1.8-amino-naphthol-4.6-disulfonic acid and which are very valuable in the form of their lakes. Our new coloring matters, on gentle reduction with stannous chlorid and hydrochloric acid, give rise to an amino-phenol-alkyl-ether and an amino compound of benzoyl-1.8-amino-naphthol-4.6-disulfonic acid. They consist generally of red to violet powders which yield blue-red solutions in water and in the form of their alkaline earth lakes possess blue-red shades.

The following example will serve to illustrate further the nature of our invention, which, however, is not confined to this example. The parts are by weight. Diazotize 123 parts of ortho-anisidin (which may be done in the usual manner) and run the solution, while stirring, into a solution of 467 parts of the disodium salt of benzoyl-1.8-amino-naphthol-4.6-disulfonic acid, to which an excess of sodium carbonate has been added. When the combination is complete, heat the mass to about 80° C., add common salt, if necessary, and then filter off and press and dry the coloring matter. It is a violet powder which dissolves in water, the solution being brilliant blue-red. In the form of its alkaline earth lakes it possesses brilliant blue-red shades. On gentle reduction with stannous chlorid and hydrochloric acid it gives rise to ortho-anisidin and an amino compound of benzoyl-1.8-amino-naphthol-4.6-disulfonic acid.

The conversion into lakes can be effected in any manner usually employed for converting coloring matters into lakes and can be carried out, if desired, without any intermediate isolation of the coloring matter.

Now what we claim is:—

1. The new azo coloring matters which can be produced by combining diazotized amino-phenol-alkyl-ethers with benzoyl-1.8-amino-naphthol-4.6-disulfonic acid, which coloring matters consist when dry of red to violet powders which yield blue-red solutions in water and in the form of their alkaline earth lakes possess brilliant blue-red shades, and which upon gentle reduction with stannous chlorid and hydrochloric acid give rise to an amino-phenol-alkyl-ether and an amino derivative of benzoyl-1.8-amino-naphthol-4.6-disulfonic acid.

2. The new azo coloring matter which can be produced by combining diazotized ortho-anisidin with benzoyl-1.8-amino-naphthol-4.6-disulfonic acid, which consists when dry of a violet powder which yields a brilliant blue-red solution in water and in the form of its alkaline earth lakes possesses brilliant blue-red shades, and which upon gentle reduction with stannous chlorid and hydrochloric acid gives rise to ortho-anisidin and an amino derivative of benzoyl-1.8-amino-naphthol-4.6-disulfonic acid.

In testimony whereof we have hereunto set our hands in the presence of two subscribing witnesses.

PAUL JULIUS.
CARL IMMERHEISER.

Witnesses:
J. ALEC. LLOYD,
JOSEPH PFEIFFER.